(12) United States Patent
Mattson et al.

(10) Patent No.: US 7,377,156 B1
(45) Date of Patent: May 27, 2008

(54) TIRE PRESSURE MONITOR SYSTEM WITH SIDE ENTRY PRESSURE PORT

(75) Inventors: Keith E. Mattson, Livonia, MI (US); Lawrence W. Hamm, Royal Oak, MI (US); William K. Cotton, Fenton, MI (US); Robert A. Stewart, South Lyon, MI (US); Michael A. Uleski, Roseville, MI (US); Rex B. Belden, Novi, MI (US); Mark A. Peterson, Plymouth, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/675,826

(22) Filed: Feb. 16, 2007

(51) Int. Cl.
*G01M 17/02* (2006.01)

(52) U.S. Cl. ........................ 73/146; 340/445

(58) Field of Classification Search .................. 73/146; 340/445
See application file for complete search history.

(56) References Cited

U.S. PATENT DOCUMENTS

| | | | | |
|---|---|---|---|---|
| 6,988,026 B2* | 1/2006 | Breed et al. | ................... | 701/29 |
| 7,089,099 B2* | 8/2006 | Shostak et al. | ............... | 701/32 |
| 7,103,460 B1* | 9/2006 | Breed | .......................... | 701/29 |
| 7,164,117 B2* | 1/2007 | Breed et al. | ................. | 250/221 |
| 7,313,467 B2* | 12/2007 | Breed et al. | ................... | 701/1 |

* cited by examiner

*Primary Examiner*—Andre J. Allen

(57) ABSTRACT

A tire pressure monitor system is provided including a sensor housing forming an internal housing mount chamber. An air inlet port is formed on a housing side surface and is orientated parallel to the wheel rim rotational axis. A sensor assembly including an air pressure sensor element is mounted within the internal housing mount chamber. A filter element and a gasket element are positioned between the air pressure sensor element and the air inlet port. A potting material fills the internal housing mount chamber. The filter element and the gasket element creating an air pressure flow path from the air inlet port to the air pressure sensor element.

20 Claims, 3 Drawing Sheets

TIRE PRESSURE MONITOR SYSTEM WITH SIDE ENTRY PRESSURE PORT

TECHNICAL FIELD

The present invention relates generally to a tire pressure monitor system and more particularly to tire pressure monitor system with side entry pressure port for moisture intrusion protection.

BACKGROUND OF THE INVENTION

Automotive design and manufacturing has included an increasing quantity of consumer and performance features. These features provide a range of information regarding vehicle performance and function. Wherein many of these systems were traditionally either accomplished manually or required a physical wire connection to vehicle computers, more systems within the vehicle now operate through wireless transmission.

A feature that provides considerable challenges involves the monitoring of vehicle tire pressure. Correct tire pressure is highly desirable as it impacts vehicle handling, fuel economy, tire wear, etc. In order to properly monitor tire pressure, systems are commonly mounted within the tire and attached to either the valve stem or the wheel rim. These systems include pressure sensors and wireless transmitters to transmit individual pressures to a central computer. As the sensor assemblies are mounted within the wheel during vehicle operations, these systems must be extremely robust. Tire impact, high rotational speeds, and quick momentum shifts must all be accommodated. Therefore it is highly desirable for the sensor assemblies to be designed for extreme conditions.

Although momentum based stressors are of considerable concern, so additionally are environmental stressors. Vehicle wheel assemblies often are exposed to considerable environmental changes. Water or other fluids may accumulate within the wheel during routine operations. When the wheel is at a twelve o'clock or six o'clock position, such accumulation may adversely effect the sensor assembly if such fluid is allowed to enter the pressure inlet port of the sensor assembly. The sensor element itself may be permanently damaged should such fluid be allowed to contact the electronics. Therefore, it is highly desirable to have a tire pressure monitor assembly that was extremely robust and was resistant to fluid intrusion. Such a monitoring assembly would increase lifespan and reduce warranty costs.

SUMMARY OF THE INVENTION

In accordance with the desires of the present invention a tire pressure monitor system is provided including a sensor housing forming all internal housing mount chamber. An air inlet port is formed on a housing side surface and is orientated parallel to the wheel rim rotational axis. A sensor assembly including an air pressure sensor element is mounted within the internal housing mount chamber. A filter element and a gasket element are positioned between the air pressure sensor element and the air inlet port. A potting material fills the internal housing mount chamber. The filter element and the gasket element creating an air pressure flow path from the air inlet port to the air pressure sensor element.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
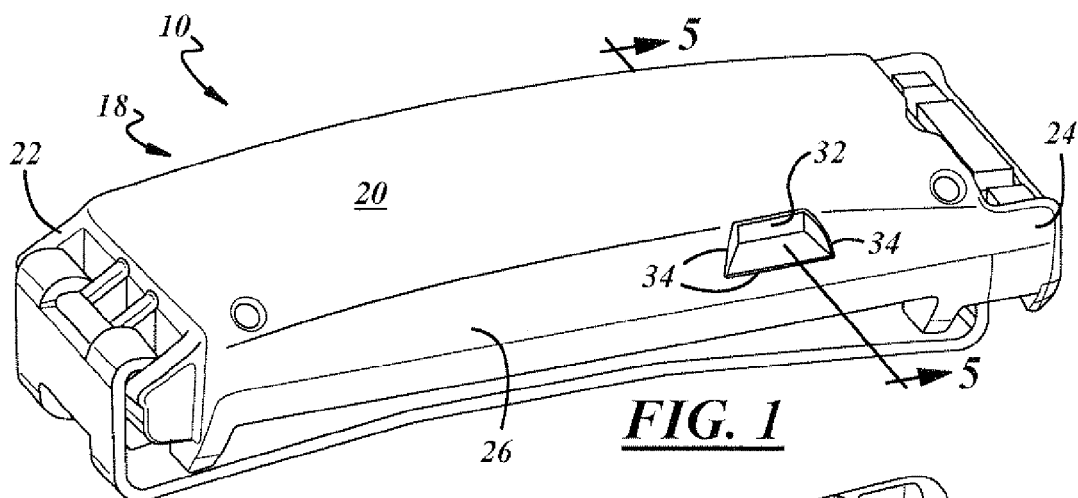
FIG. 1 is an illustration a tire pressure monitor system in accordance with the present invention.
Figure 2:
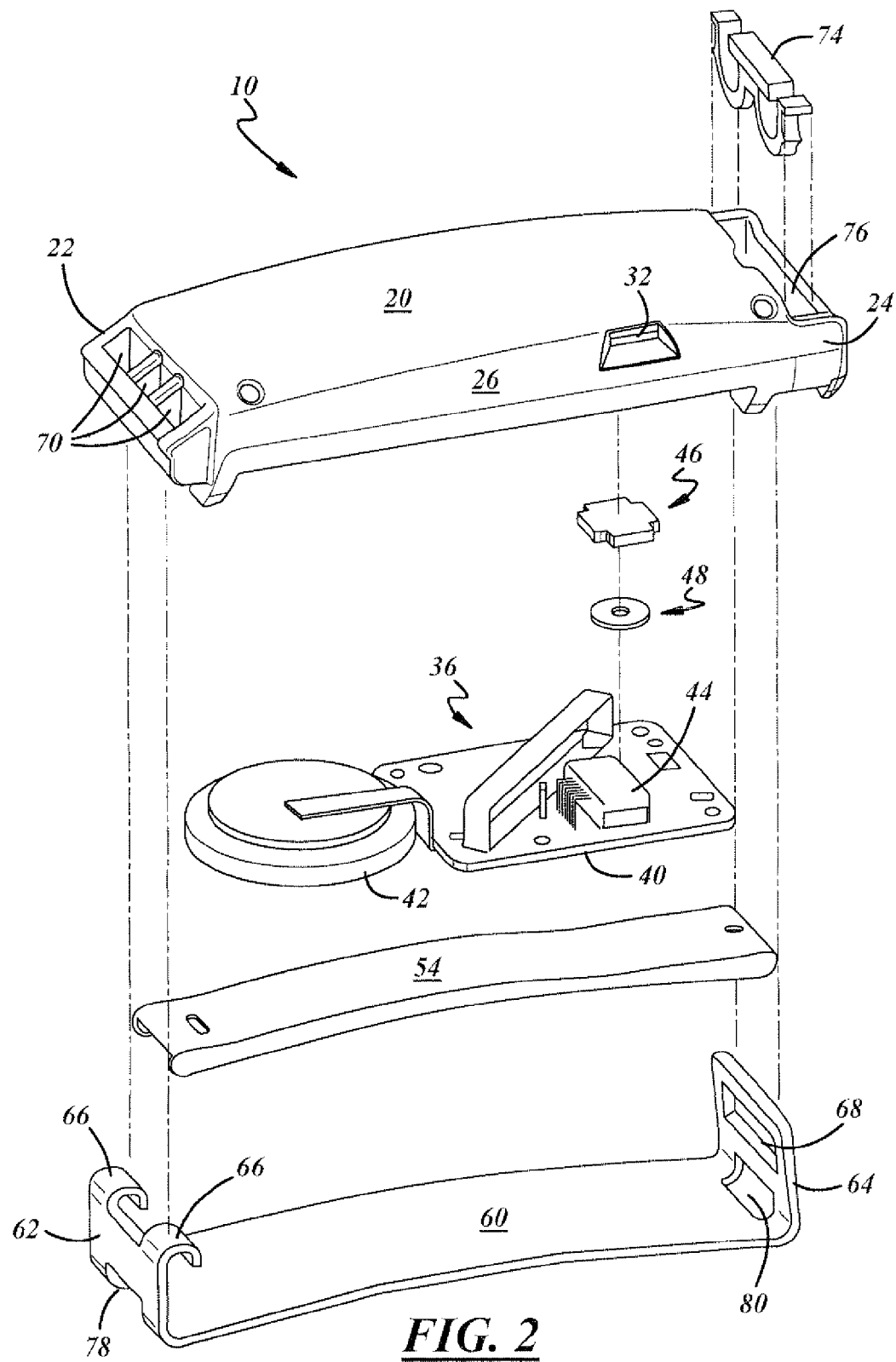
FIG. 2 is an exploded view illustration of the tire pressure monitor system illustrated in FIG. 1.
Figure 6:
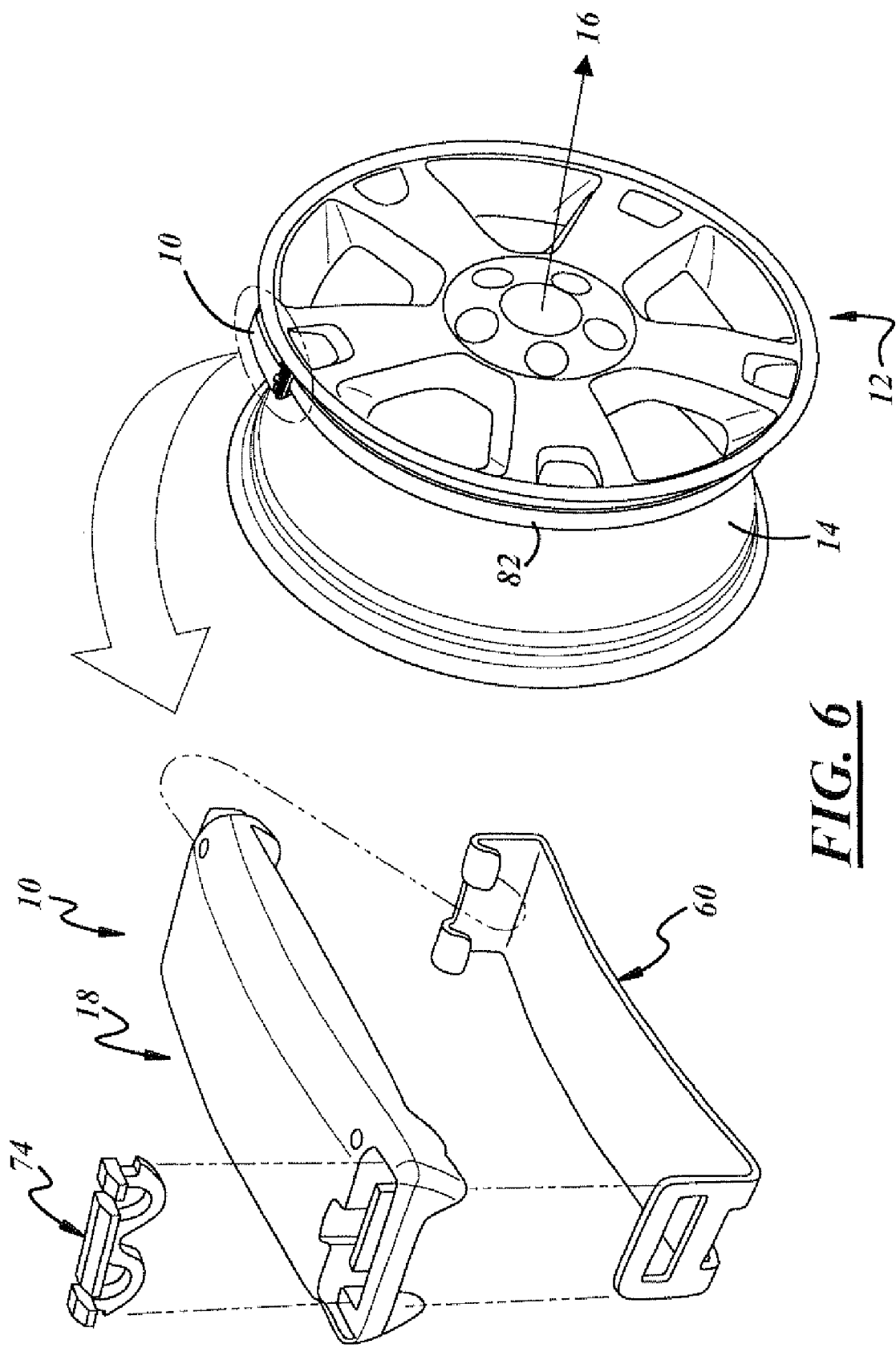
FIG. 6 is a detailed illustration of the tire pressure monitor system illustrated in FIG. 1, the system illustrated mounted on a wheel rim

Referring now to FIGS. 1 and 2, which is are illustrations of an tire pressure monitor system 10 in accordance with the present invention. It is contemplated that the tire pressure monitor system 10 is for use in automotive vehicles, although a variety of tire based applications may be obvious in light of the present disclosure. The tire pressure monitor system 10 is intended for installation into a wheel rim 12 having a wheel rim inner surface 14 and a wheel rim rotational axis 16 (see FIG. 6). Although the tire pressure monitor system 10 may be installed onto the wheel rim 12 using a variety of methodologies, it is preferably contemplated that the system 10 is installed using a band attachment methodologies.

Figure 3:
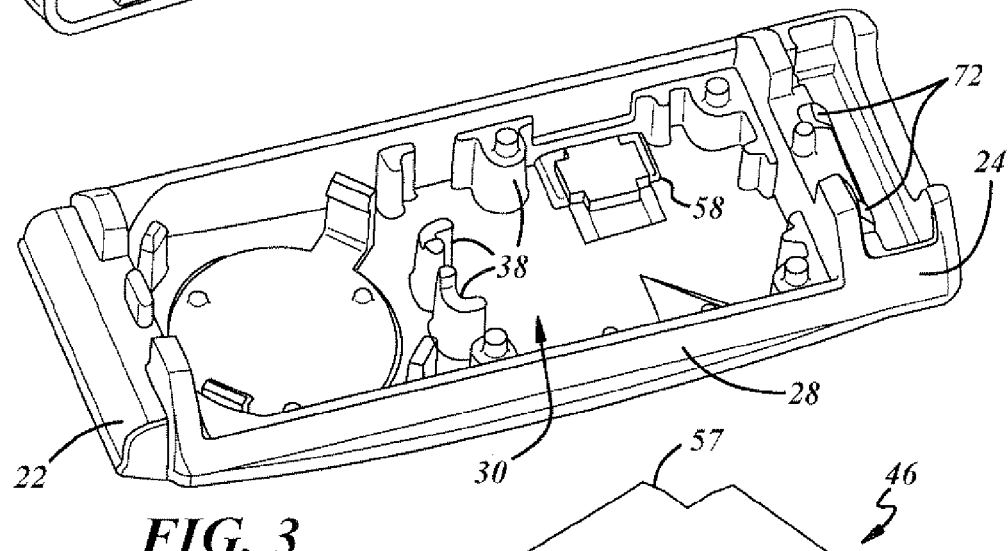
FIG. 3 is a bottom view illustration of the sensor housing shown as a portion of the tire pressure monitor system illustrated in FIG. 1.

The tire pressure monitor system 10 includes a sensor housing 18 having an arched configuration suitable for engaging the wheel rim inner surface 14. The sensor housing 18 is preferably molded to generate a housing upper surface 20, a first housing end surface 22, a second housing end surface 24, a first housing side surface 26 and a second housing side surface 28. The molded sensor housing 18 additionally generate an internal housing mount chamber 30 (see FIG. 3). An air inlet port 32 is formed into the first housing side surface 26 and is configured such that upon installation of the tire pressure monitor system 10, the air inlet port 32 will be orientated parallel to the wheel rim rotational axis 16. This orientation prevents fluids accumulated around the wheel rim inner surface 14 from pooling and entering the air inlet port 32. Additional, in at least one embodiment it is contemplated that the air inlet port 32 include a plurality of beveled inlet sidewalls 34 that further encourage moisture and fluids to flow away from the air inlet port 32.

A sensor assembly 36 is mounted within the internal housing mount chamber 30. The sensor assembly 36 is secured by a plurality of mount posts 38 formed within the internal housing mount chamber 30. The sensor assembly 36 preferably is comprised of a circuit board 40 configured to house a battery element 42 and an air pressure sensor element 44. Although a variety of air pressure sensor elements 44 are contemplated, one embodiment contemplates the use of a top port pressures sensor. In between the sensor element 44 and the air inlet port 32 is positioned a filter element 46 and a gasket element 48. The filter element 46 is preferably pressed up against and in immediate contact with the air inlet port 32. The gasket 48, in turn, is pressed between the filter element 46 and the air pressure sensor element 44. After these components are assembled, a potting material 50 is injected into the interior housing mount chamber 30 and cured. The potting material 50 surrounds the sensor assembly 36, the filter element 46 and gasket 48. The potting material 50, however, cannot penetrate the filter element 46 or gasket 48. Therefore, as the potting material 50 hardens, the filter element 46 and gasket 48 form an air pressure flow path 52 from the air inlet port 32 to the air pressure sensor element. A housing base 54 may be further utilized to encapsulate the sensor assembly 36 and potting material 50 within the internal housing mount chamber 30.

Figure 4:
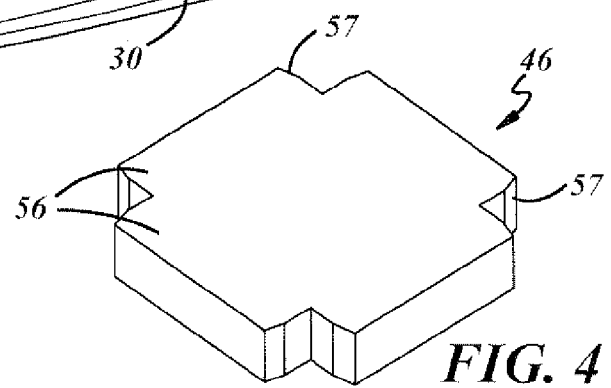
FIG. 4 is a detail illustration of the filter element for use in the tire pressure monitor system illustrated in FIG. 1.
Figure 5:
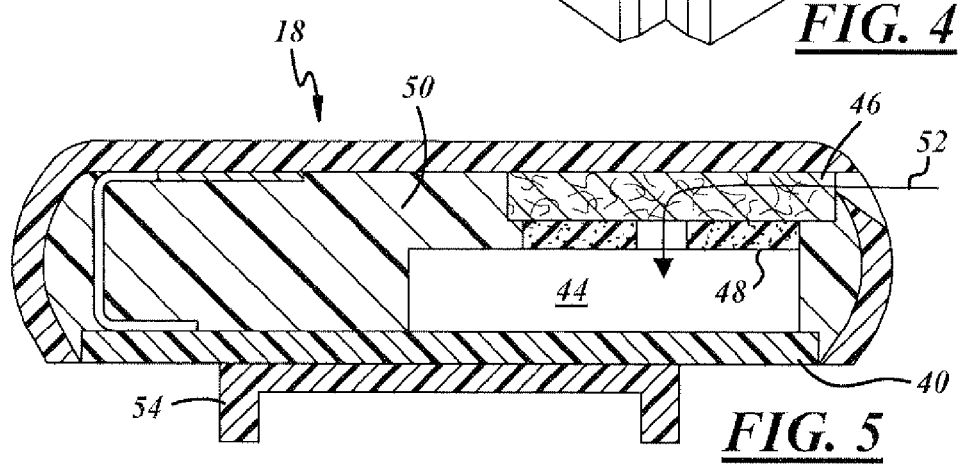
FIG. 5 is a cross-sectional illustration of the tire pressure monitor system illustrated in FIG. 1.

Although the filter element 46 has been described generically, it is contemplated that the filter element 46 be comprised of a symmetrical filter element for ease of installation. It is additionally contemplated that in at least one embodiment, the filter element 46 be comprised of micro porous polytetrafluoroethylene. It is further contemplated that the filter element 46 may be comprised of a cross-shaped filter element 46, see FIG. 4, including a plurality of cross-arm portions 56. By forming lead-in chamfers 57 on the cross-arm portions 56 the filter element 46 generates a slight interference with a housing filter chamber 58 formed in the internal housing mount chamber 30 to provide a seal against potting 50 leakage. In at least one embodiment, the gasket 48 works in combination with the housing filter chamber 58 to further reduce potting leakage.

The present invention further contemplates the use of a band mount brace 60. The mount brace 60 is comprised of a first brace end 62 and a second brace end 64. A plurality of hinge arms 66 are preferably formed in the first brace end 62 while a lock slot 68 is preferably formed in the second brace end 64. These components are configured to mate with a plurality of hinge slots 70 formed on the first housing end surface 22 and at least one lock element 72 formed on the second housing end surface 24. In this fashion, the first housing end surface 22 rotatably engages the first brace end 62. The sensor housing 18 is rotated down until the lock element 72 engages the lock slot 68 and the sensor housing 18 is thereby secured to the band mount brace 60. A position lock element 74 can then be inserted into a position chamber 76 formed in the sensor housing 18 to prevent disengagement of the lock element 72 from the lock slot 68.

A first brace inlet 78 and a second brace inlet 80 are formed in the first brace end 62 and second brace end 64 respectively. These allow a band element 82 to be threaded through these inlets 78,80 and used to secure the tire pressure mount system 10 to the wheel rim inner surface 14 (see FIG. 6). The orientation of the air inlet port 32 in combination with the beveled inlet sidewalls 34 prevents fluid intrusion through the inlet port 32. The insertion and curing of the potting material 50 allows the filter element 46 and gasket 48 to automatically form internal plumbing for distribution of air from the air inlet port 32 to the air pressure sensor 44.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A tire pressure monitor system is provided for mounting on a wheel rim having a wheel rim inner surface and a wheel rim rotational axis, the tire pressure monitor system comprising:

a sensor housing comprising a housing upper surface, a first housing end surface, a second housing end surface, a first housing side surface, and a second housing side surface, said sensor housing forming an internal housing mount chamber;

an air inlet port formed on said first housing side surface, said sensor housing configured to engage the wheel rim inner surface such that said air inlet port is orientated parallel to the wheel rim rotational axis;

a sensor assembly comprising a circuit board, a battery element, and an air pressure sensor element mounted on said circuit board, said sensor assembly mounted within said internal housing mount chamber;

a filter element mounted within said internal housing mount chamber immediately adjacent said air inlet port:

a gasket element mounted between said filter element and said air pressure sensor element;

a potting material filling said internal housing mount chamber, said potting material surrounding said filter element, said gasket element and said air pressure sensor element, said filter element and said gasket element creating an air pressure flow path from said air inlet port to said air pressure sensor element.

2. A tire pressure monitor system as described in claim 1, further comprising:

a housing base, said sensor assembly positioned between said housing base and said sensor housing; and a band mount brace, said housing base positioned between said sensor housing and said band mount brace.

3. A tire pressure monitor system as described in claim 1, further comprising:

a plurality of beveled inlet side walls surrounding said air inlet port.

4. A tire pressure monitor system as described in claim 1, wherein said filter element comprises micro porous polytetrafluoroethylene.

5. A tire pressure monitor system as described in claim 1, wherein said filter element comprises a cross-shaped filter element having lead-in chamfers formed into cross-arm portions.

6. A tire pressure monitor system as described in claim 1, wherein said filter element comprises a symmetrical filter element.

7. A tire pressure monitor system as described in claim 1, further comprising:

a housing filter chamber formed into said internal housing mount chamber, said housing filter chamber securing said filter element.

8. A tire pressure monitor system as described in claim 2, further comprising:

a plurality of hinge slots formed into said first housing end surface; and a plurality of hinge arms formed on a first brace end of said band mount brace, said plurality of hinge arms engaging said plurality of hinge slots to rotatably secure said sensor housing to said band mount brace.

9. A tire pressure monitor system as described in claim 8, further comprising:

a lock element formed into said second housing end surface; and a lock slot formed on a second brace end of said band mount brace, said lock element engaging said lock slot to secure said sensor housing to said band mount brace.

10. A tire pressure monitor system as described in claim 9, further comprising:

a position lock element inserted into a position chamber formed in said second housing end surface said position lock element preventing said lock element from disengaging said lock slot.

11. A tire pressure monitor system as described in claim 2, wherein said band mount brace includes a first brace inlet and a second brace inlet.

12. A tire pressure monitor system as described in claim 11, further comprising:
a band element passing through said first brace inlet and said second brace inlet, said band element configured to secure said band mount brace to the wheel rim inner surface.

13. A tire pressure monitor system is provided for mounting on a wheel rim having a wheel rim inner surface and a wheel rim rotational axis, the tire pressure monitor system comprising:
a sensor housing comprising a housing upper surface, a first housing end surface, a second housing end surface, a first housing side surface, and a second housing side surface, said sensor housing forming an internal housing mount chamber;
an air inlet port formed on said first housing side surface, said sensor housing configured to engage the wheel rim inner surface such that said air inlet port is orientated parallel to the wheel rim rotational axis;
a sensor assembly including an air pressure sensor element mounted within said internal housing mount chamber;
a filter element mounted within said internal housing mount chamber immediately adjacent said air inlet port:
a gasket element mounted between said filter element and said air pressure sensor element;
a potting material filling said internal housing mount chamber, said potting material surrounding said filter element, said gasket element and said air pressure sensor element, said tilter element and said gasket element creating an air pressure flow path from said air inlet port to said air pressure sensor element; and
a band mount brace mounted to said sensor housing, said sensor assembly positioned between said housing upper surface and said band mount brace.

14. A tire pressure monitor system as described in claim 13, further comprising:
a plurality of beveled inlet side walls surrounding said air inlet port.

15. A tire pressure monitor system as described in claim 13, wherein said filter element comprises micro porous polytetrafluoroethylene.

16. A tire pressure monitor system as described in claim 13, further comprising:
a plurality of hinge slots formed into said first housing end surface; and a plurality of hinge arms formed on a first brace end of said band mount brace, said plurality of hinge arms engaging said plurality of hinge slots to rotatably secure said sensor housing to said band mount brace.

17. A tire pressure monitor system as described in claim 16, further comprising:
a lock element formed into said second housing end surface; and a lock slot formed on a second brace end of said band mount brace, said lock element engaging said lock slot to secure said sensor housing to said band mount brace.

18. A method of manufacturing a tire pressure monitor system for mounting on a wheel rim having a wheel rim inner surface and a wheel rim rotational axis comprising:
molding a sensor housing comprising a housing upper surface, a first housing end surface, a second housing end surface, a first housing side surface, and a second housing side surface, said sensor housing forming an internal housing mount chamber;
forming an air inlet port during said molding such that said air inlet port is formed on said first housing side surface, said sensor housing configured to engage the wheel rim inner surface such that said air inlet port is orientated parallel to the wheel rim rotational axis;
positioning a filter element mounted within said internal housing mount chamber immediately adjacent said air inlet port:
positioning a gasket element such that said filter element is positioned between said air inlet port and said gasket element;
mounting a sensor assembly including an air pressure sensor element within said internal housing mount chamber such that said filter element and said gasket element are pressed between said air pressure sensor and said air inlet port;
filling a said internal housing mount chamber with a potting material such that said potting material surrounds said filter element, said gasket element and said air pressure sensor element, said filter element and said gasket element creating an air pressure flow path from said air inlet port to said air pressure sensor element; and
mounting a band mount brace to said sensor housing, said sensor assembly positioned between said housing upper surface and said band mount brace.

19. A method as described in claim 18 wherein said air inlet port is formed to include a plurality of beveled inlet side walls.

20. A method as described in claim 18, further comprising:
placing a band element through a first brace inlet and a second brace inlet formed into said band mount brace.

* * * * *